May 30, 1939.  G. A. ROSS  2,160,754
FIELD STANDARD
Filed Feb. 4, 1938
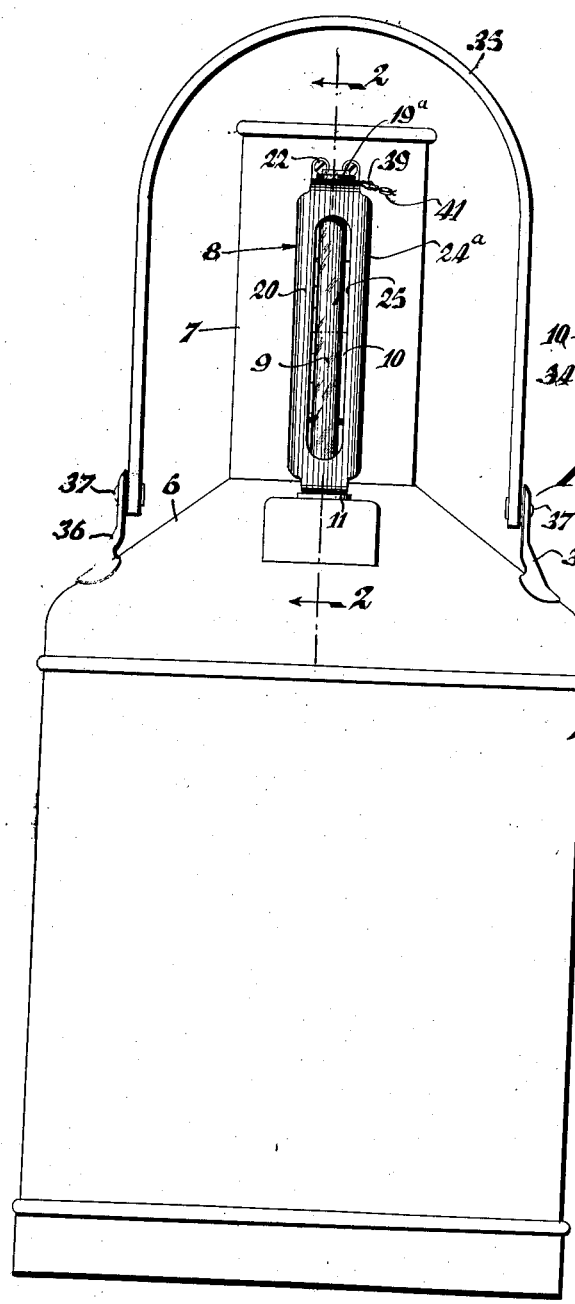
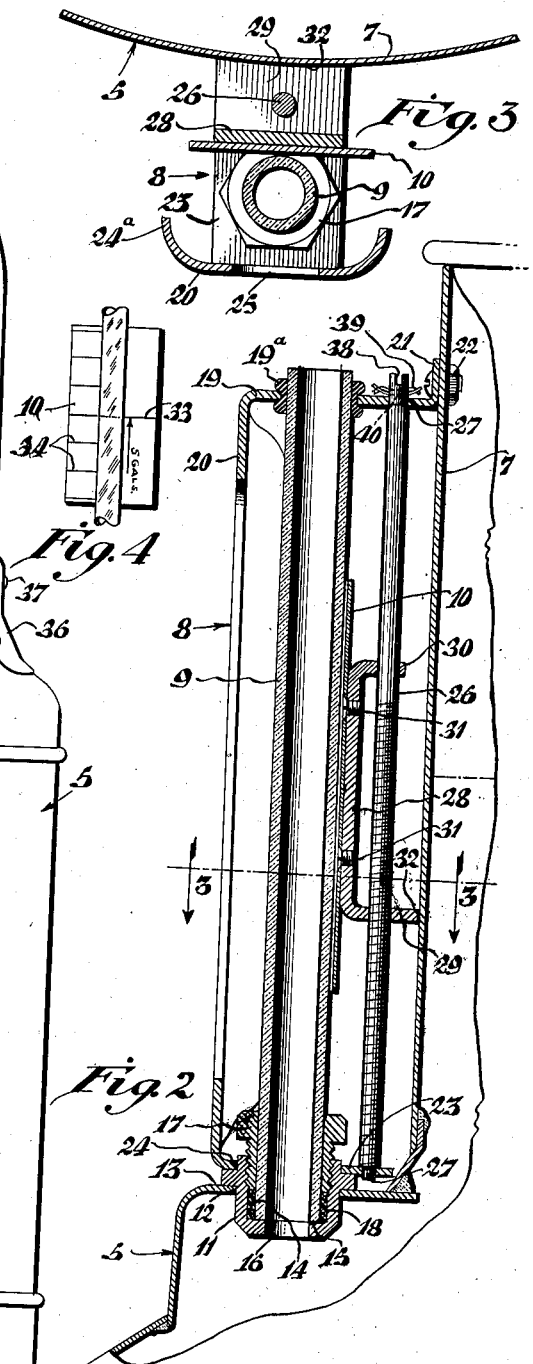
INVENTOR.
BY George A. Ross
Wood & Wood  ATTORNEYS.

Patented May 30, 1939

2,160,754

UNITED STATES PATENT OFFICE 2,160,754

FIELD STANDARD

George A. Ross, Norwood, Ohio, assignor to The Cincinnati Ball Crank Company, Cincinnati, Ohio, a corporation of Ohio Application February 4, 1938, Serial No. 188,730

10 Claims. (Cl. 73—166)

The present invention is an improvement over field standards or master measures of the type disclosed in Patent No. 1,277,760, granted to Theophilus A. Seraphin, on September 3, 1918. These devices consist of containers adapted to hold liquid. The size of the containers is such as to permit the container to receive a certain amount of liquid and yet have space left over for tolerance.

A gauge and indicator means is included adjacent the point at which a predetermined amount of liquid to be gauged will normally establish its level for the purpose of enabling the operator to determine accuracy or inaccuracy by noting the relationship of the level to a normally fixed graduation. This gauge or indicator means, for showing the accuracy or inaccuracy of the measurement, may be adjusted to and sealed at the correct position by the inspector of weights and measures. The present improvements relate in particular to the structure of the gauge and indicator means.

It has been the object of the present invention to provide a gauge and level indicator means which efficiently protects the glass tube, forming a part of the means, from breakage such as would result from damaging blows or the falling of the container.

Additionally, it has been an object of the inventor to improve the arrangement of the tube and indicator plate whereby reading of the gauge is facilitated.

Furthermore, the object of the inventor has been to provide an improved mounting for the glass tube and the adjustable gauge or indicator plate, whereby the plate is mounted and maintained in the correct relationship to the guage tube and is efficiently guided for adjustment, and the tube is efficiently cushioned against the effects of vibration or jarring.

These objectives have been attained in a structure wherein the tube is supported at its upper and lower end in an improved bracket arrangement including a resilient mounting and providing a guard encircling and protecting the tube at the front side. The indicator plate, carrying the graduations for determining the accuracy or inaccuracy of the liquid level, is supported by means of a screw which is adapted to raise and lower the plate along the tube, and is efficiently guided and mainatined against rotation by means of sliding contact with the container. The plate is located behind the glass tube, so that the graduation may be observed through the gauge tube.

Further objects and certain advantages will be more fully apparent from a description of the accompanying drawing, in which:

Figure 1 is a front view of the improved field standard.

Figure 2 is a sectional view, taken on line 2—2, Figure 1, detailing the level indicating mechanism.

Figure 3 is a sectional view, taken on line 3—3, Figure 2.

Figure 4 is a front view of the indicator element 10 and the glass gauge tube, showing the relationship of these parts.

The master measure or field standard in which the present improvements are shown consists of a container, indicated at 5, adapted to receive a predetermined amount of liquid, such as five gallons. The container provides a tapered top 6 and an upward extension or column 7. The neck or column 7 is of relatively small diameter as opposed to the diameter of the body of the container. Accordingly, slight variations in amount of liquid placed in the container will cause a material change in the level of the liquid column in the neck of the container. The total space within the container, including the neck, is greater than that required to receive the specified amount of liquid. The five gallon level is established intermediate of the length of the column. For this reason, slight variations above and below this level may be readily noted.

The level gauging and indicating apparatus 8 is provided at the front of this neck or extension. This device consists essentially of a glass gauge tube 9 and an adjustable indicator or scale plate 10.

The glass gauge tube 9 is supported in a vertical position. The lower end of the tube is mounted in a socket 11 secured in a horizontal portion of the container structure. Specifically, this socket depends through an opening 12 in a horizontal wall 13 of the container and includes a central bore 14 providing a shoulder 15 upon which the lower end of the tube rests. The bore of the socket opens into the container through an opening 16 of the same diameter as the internal diameter of the tube. A packing gland 17 surrounds the tube and is screwed into the socket for compressing a packing 18 into the bottom of the counterbore of the socket and around the glass tube for sealing the same.

The upper end of the tube is fixed in position in a rubber grommet 19a secured within an opening in the horizontal flange 19 of a guard plate 20. The flange 19 includes a vertical flange 21 extending upwardly and secured to the neck of the container by means of bolts 22. A horizontal flange 23, at the lower end of the face plate, has an aperture 24 therein which fits about a counterturned, external portion of the socket. The main vertical portion of the faceplate is curved inwardly at each side as at 24a toward the neck (see Figure 3), as regarded in plan section, for the purpose of overhanging and protecting the glass gauge. A vertical slot 25 provides the sight opening for viewing the glass gauge.

The indicator plate or scale member 10 is supported in back of the gauge on a vertically disposed, screw-threaded adjustment rod 26. The upper and lower ends of the rod are counterturned, as at 27. The counterturned ends are rotatably mounted in the upper and lower flanges 19, 23 of the faceplate. A bracket 28 supports the gauge element on the rod, including for this purpose a lower horizontal flange 29, through which the rod is screw-threaded, and an upper horizontal flange 30 having a plain bore traversed by the adjustment rod. The gauge plate is fixed to this bracket by means of screws 31.

The lower flange of the bracket extends into sliding contact with the neck of the container. For the purpose of uniform contact, its inner edge 32 is arcuate to fit the curvature of the neck.

Noting Figure 4, it will be observed that the gauge plate includes a horizontal mark 33 bearing the indication "5 gals.". This mark extends entirely across the plate in back of the glass gauge. The side of the gauge adjacent the glass tube includes a series of graduations 34 above and below the five gallon mark. These marks may represent ounces and indicate the deviations from accuracy above and below the five gallon mark.

The container is provided with a handle 35 of U-shape. The handle element has its ends attached to ears 36 extending upwardly from the tapered top of the container. Pivot pins 37 secure the handle to the ears.

One of the primary uses of this device is that of testing the accuracy of automatic service station gasoline pumps. The adjustment rod 26 includes a slot 38 for receiving a screw driver at its upper end, and so may be rotated for adjusting the gauge plate. This adjustment is performed by the inspector of weights and measures. The inspector sets the gauge at the proper height to indicate five gallons and seals the rod against further rotation by passing a wire 39 through a transverse pin hole 40 in the upper end of the rod and fixing the ends of the wire together by means of a lead seal 41.

In making the test, the operator places the container below the nozzle of the pump and operates the pump in the usual manner for delivering five gallons. If the amount discharged into the standard is correct, the liquid level will coincide with the five gallon mark on the gauge plate as the liquid rises in the glass gauge to the same level as that in the neck. If there is any variation from accuracy, it may be detected by the position of the level above or below the accuracy mark, and the amount of the inaccuracy may be noted by a reading taken with respect to the tolerance indications at the left hand side of the gauge plate.

Having described my invention, I claim:

1. A field standard, comprising, a container, a glass gauge tube communicating with the interior of the container, a scale support extending along the gauge tube and slidably fitted to the contour of the container, whereby it cannot rotate, and an adjustment screw for traversing said scale support along the gauge tube.

2. A field standard, comprising, a container provided with an upwardly extended column, an upright glass gauge tube fixed in front of the column portion, said tube supported upon the container and in communication with the interior thereof at the base, a socket supporting the lower end of the tube, a screw-threaded adjustment rod supported on the container parallel to and in back of the tube, a gauge plate adjustably mounted on said rod in back of the glass tube, said gauge plate including a horizontal graduation indicating the correct level and a guard encircling the front of said tube including a sight opening therein.

3. A field standard, comprising, a container, an upright glass gauge tube fixed in front of the container, a slotted guard plate for the tube, said guard plate including inwardly directed bracket portions adjacent the ends of the glass gauge tube, said portions secured to the container, a socket supporting the lower end of the tube and connecting the tube with the interior of the container, the upper end of said tube disposed through and fixed in the upper end of the guard plate, a screw-threaded adjustment rod supported in the bracket portions of the guard plate parallel to and in back of the tube, and a graduated gauge plate adjustably mounted on said rod in back of the glass tube.

4. A field standard, comprising, a container, a glass gauge tube communicating with the interior of the container, a scale support disposed in back of said glass gauge tube and slidably non-rotatably fitted to the contour of the container, and means for adjusting and fixing said scale support relative to said glass gauge tube.

5. A field standard, comprising, a container having a reduced diameter portion, a glass gauge tube disposed vertically along said reduced diameter portion and communicating with the interior of the container, a scale plate disposed in back of the glass tube, an adjustment screw supporting said scale plate with respect to the container and the glass gauge tube, said scale plate including guiding means slidably fitting against the external surface of the reduced diameter portion, and a bracket for supporting said glass tube and said adjustment screw, said bracket including a tube guarding portion encircling the front of the tube.

6. A field standard, comprising, a container provided with an upwardly extended column, an upright glass gauge tube fixed in front of the column portion, said tube supported upon the container and in communication with the interior thereof at the base, a guard plate secured to the neck at its upper end, a socket supporting the lower end of the tube, said guard plate attached to said socket, the upper end of said tube disposed through and fixed in the upper end of the bracket, a screw-threaded adjustment rod supported in the bracket parallel to and in back of the tube, and a gauge plate adjustably mounted on said rod in back of the glass tube, said gauge plate including a horizontal graduation indicating the correct level.

7. In a master measure for liquids, a container, a tubular sight glass in communication with said container, a protective mounting bracket for said sight glass, having a vertical member and upper and lower laterally extended arms secured to said container, said sight glass mounted vertically in spaced parallel relationship with said vertical member and secured in said lateral arms, said vertical member extended partially around said sight glass to protect the same, and having a sight opening in the face thereof.

8. In a master measure for liquids, a container and a liquid level gauge for said container, said gauge comprising; a tubular sight glass, a bracket for mounting said sight glass, a reference plate mounted behind said sight glass, a screw-threaded adjustment rod for supporting said reference plate, screw-threaded means on said reference plate engaged on said rod adapting said plate to be adjusted vertically upon rotation of said rod, said screw-threaded means including a lateral extension in sliding contact with said container to secure said plate against rotation.

9. A liquid level gauge comprising, a U-shaped bracket, said U-shaped bracket having its bight disposed vertically and including a window, and its arms connected to the container to be gauged, a reference plate mounted within said bracket, a tubular sight glass mounted within said bracket in front of said plate and in alignment with said window, whereby the reference plate is adapted to be viewed through said window and said sight glass to accuratetly determine the liquid level in said sight glass with respect to said reference plate.

10. A master measure for liquids, said measure including a gauge comprising, a tubular sight glass, a vertically adjustable reference plate, said sight glass and reference plate mounted in a U-shaped bracket, adjustment means for said reference plate, comprising, a vertical screy-threaded rod extended through the arms of said bracket, and a U-shaped element mounting said reference plate on said rod and adapted to be adjusted vertically upon rotation of said rod, said mounting element comprising a vertical member and upper and lower lateral arms traversed by said rod, one of said arms extended laterally and in sliding contact with said container to prevent rotation thereof upon rotation of said rod.

GEORGE A. ROSS.